US012208921B2

(12) United States Patent
Cai et al.

(10) Patent No.: US 12,208,921 B2
(45) Date of Patent: Jan. 28, 2025

(54) BEACON AND LANDING METHOD FOR UNMANNED AERIAL VEHICLE

(71) Applicant: BEIJING SANKUAI ONLINE TECHNOLOGY CO., LTD, Beijing (CN)

(72) Inventors: Jiancheng Cai, Beijing (CN); Xinmin Liu, Beijing (CN); Yexun Zhang, Beijing (CN); Mingyang Jiang, Beijing (CN); Yinian Mao, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/363,129

(22) Filed: Aug. 1, 2023

(65) Prior Publication Data
US 2023/0373667 A1 Nov. 23, 2023

Related U.S. Application Data

(63) Continuation of application No. PCT/CN2022/102490, filed on Jun. 29, 2022.

(30) Foreign Application Priority Data

Jul. 2, 2021 (CN) .......................... 202110750123.7

(51) Int. Cl.
*B64F 1/18* (2006.01)
*B64U 70/95* (2023.01)
(Continued)

(52) U.S. Cl.
CPC .......... *B64F 1/18* (2013.01); *G06K 19/06037* (2013.01); *G08G 5/0026* (2013.01);
(Continued)

(58) Field of Classification Search
CPC .. B64F 1/18; G06K 19/06037; G08G 5/0026; G08G 5/0069
See application file for complete search history.

(56) References Cited

U.S. PATENT DOCUMENTS 4,292,655 A 9/1981 Carasso et al.
2016/0124431 A1 5/2016 Kelso et al.
(Continued)

FOREIGN PATENT DOCUMENTS

CN 105631409 A 6/2016
CN 106127201 A 11/2016
(Continued)

OTHER PUBLICATIONS

International Search Report of the International Searching Authority for State Intellectual Property Office of the People's Republic of China in PCT application No. PCT/CN2022/102490 issued on Sep. 7, 2022, which is an international application to which this application claims priority.

(Continued)

*Primary Examiner* — Matthew Mikels
(74) *Attorney, Agent, or Firm* — Kolitch Romano Dascenzo Gates LLC

(57) ABSTRACT

This application discloses a beacon for guiding landing of an unmanned aerial vehicle. The beacon includes at least three levels of patterns: one first-level pattern and at least one second-level pattern, where the at least one second-level pattern is superposed above the first-level pattern, and an area of the second-level pattern is less than that of the first-level pattern.

16 Claims, 6 Drawing Sheets

(51) Int. Cl.
  *G06K 19/06* (2006.01)
  *G08G 5/00* (2006.01)
  *G08G 5/02* (2006.01)

(52) U.S. Cl.
  CPC .......... *G08G 5/0069* (2013.01); *G08G 5/025* (2013.01); *B64U 70/95* (2023.01)

(56) References Cited

U.S. PATENT DOCUMENTS

| | | | |
|---|---|---|---|
| 2017/0225800 | A1 | 8/2017 | Holt et al. |
| 2021/0031945 | A1* | 2/2021 | Inoshita ................. G05D 1/101 |

FOREIGN PATENT DOCUMENTS

| | | | |
|---|---|---|---|
| CN | 106527487 | A | 3/2017 |
| CN | 108873943 | A | 11/2018 |
| CN | 110595476 | A | 12/2019 |
| CN | 110865649 | A | 3/2020 |
| CN | 110879617 | A | 3/2020 |
| CN | 110989661 | A | 4/2020 |
| CN | 111221343 | A | 6/2020 |
| CN | 111930146 | A | 11/2020 |
| CN | 112163803 | A | 1/2021 |
| CN | 112987764 | A | 6/2021 |
| CN | 113537430 | A | 10/2021 |
| JP | 55067923 | A | 5/1980 |
| JP | 2002217738 | A | 8/2002 |
| JP | 2007156801 | A | 6/2007 |
| WO | 2019175993 | A1 | 9/2019 |

OTHER PUBLICATIONS

The State Intellectual Property Office of People's Republic of China, First Office Action in Patent Application No. 202110750123.7 issued on Apr. 13, 2022, which is a foreign counterpart application corresponding to this U.S. Patent Application, to which this application claims priority.

The State Intellectual Property Office of People's Republic of China, Notification to Grant Patent Right for Invention of Chinese application No. 202110750123.7 issued on Apr. 28, 2022, which is foreign counterpart application of this US application.

Ren, Dejian et al., "UAV High-precision Auxiliary Landing Device Based on Ultraviolet Beacon and Its Application", Tianjin Science & Technology, vol. 46 No. 9, Sep. 30, 2019, entire document.

Notice of Reasons for Refusal of Japanese application No. 2023-547719 issued on May 7, 2024.

Extended European Search Report Communication Pursuant to Rule 62 EPC for European Application No. 22832133.7 dated Jun. 13, 2024, which is a foreign counterpart application to this application.

* cited by examiner

FIG. 10
FIG. 11
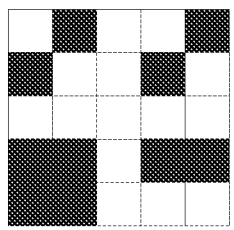
FIG. 12
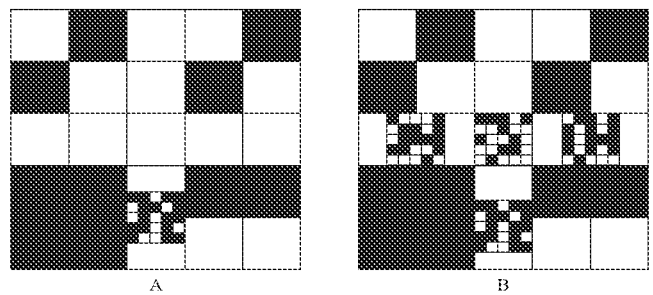
FIG. 13

BEACON AND LANDING METHOD FOR UNMANNED AERIAL VEHICLE

CROSS REFERENCE TO RELATED APPLICATION

This application is a continuation application of international application No. PCT/CN2022/102490, filed on Jun. 29, 2022, this application claims priority to Chinese Patent Application No. 202110750123.7, entitled "BEACON, BEACON GENERATION METHOD, BEACON GENERATION APPARATUS, AND DEVICE", and filed on Jul. 2, 2021, which is incorporated herein by reference in its entirety.

TECHNICAL FIELD

Embodiments of this application relate to the technical field of unmanned aerial vehicles, and in particular to a beacon and a landing method for an unmanned aerial vehicle.

BACKGROUND

With development of unmanned aerial vehicle technology, the application fields of unmanned aerial vehicles have become broader. Accurate landing of unmanned aerial vehicles is a crucial link in unmanned aerial vehicle delivery. Therefore, a beacon generation method is required to generate a high-reliability beacon for guiding the unmanned aerial vehicle to accurately land.

SUMMARY

Embodiments of this application provide a beacon and a landing method for an unmanned aerial vehicle. The technical solution is as follows:

An embodiment of this application provides a beacon. The beacon may be used for guiding landing of an unmanned aerial vehicle. The beacon includes one first-level pattern and at least one second-level pattern, where the at least one second-level pattern is superposed above the first-level pattern, and an area of the second-level pattern is less than that of the first-level pattern.

In some embodiments, the first-level pattern includes a pattern portion with a first color and a pattern portion with a second color, and the at least one second-level pattern is superposed above the first-level pattern, including:
the at least one second-level pattern being located on the pattern portion with the first color in the first-level pattern.

In some embodiments, there are at least two second-level patterns, and the at least one second-level pattern is superposed above the first-level pattern, including:
the at least two second-level patterns being superposed above the first-level pattern, and any two of the second-level patterns being not overlapped.

In some embodiments, the beacon further includes at least two third-level patterns, where the at least two second-level patterns and the at least two third-level patterns are dispersedly superposed above the first-level pattern, and any two of the at least two second-level patterns and the at least two third-level patterns are not overlapped; and an area of the third-level pattern is less than that of the second-level pattern.

In some embodiments, the at least two second-level patterns are different.

In some embodiments, the at least two third-level patterns are different.

In some embodiments, a center position of the first-level pattern is provided with at least one second-level pattern or at least one third-level pattern.

In some embodiments, the area of the first-level pattern is 9-36 times the area of the second-level pattern, and the area of the second-level pattern is 3-9 times the area of the third-level pattern.

In some embodiments, the beacon includes one first-level pattern, four second-level patterns and five third-level patterns;
one second-level pattern is respectively superposed above a left, bottom, right and middle of the first-level pattern, and the five third-level patterns are superposed above a top of the first-level pattern in a layout where four third-level patterns are arranged in a grid of columns and rows, and one third-level pattern is arranged below the grid;
or, one second-level pattern is respectively superposed above the top, bottom, left and right of the first-level pattern, and the five third-level patterns are superposed above the middle of the first-level pattern in a layout where four third-level patterns are arranged in a grid of columns and rows, and one third-level pattern is arranged above the grid.

In some embodiments, the first-level pattern is obtained based on a reference code, the second-level pattern is obtained based on a second-level code, and the third-level pattern is obtained based on a third-level code,
where the second-level code is derived from at least one first code, the at least one first code is obtained based on the reference code, and the third-level code is derived from a first code, different from the second-level code, in the at least one first code; and
a distance between any two of the at least one first code and the reference code is not less than a first distance, and the first code is consistent to the reference code in number of digits.

An embodiment of this application provides a landing method for an unmanned aerial vehicle, including: recognizing any above beacon, adjusting a descent speed or descent direction of the unmanned aerial vehicle based on the recognized beacon, such that the unmanned aerial vehicle lands at a preset position.

BRIEF DESCRIPTION OF THE DRAWINGS

To describe the technical solutions of embodiments of this application more clearly, the following briefly introduces the drawings required for describing the embodiments. Apparently, the drawings in the following description show only some embodiments of this application, and a person of ordinary skill in the art may still derive other drawings from these drawings without creative efforts.

FIG. 4 is a schematic diagram of a first target pattern according to an embodiment of this application;

FIG. 5 is a schematic diagram of an intermediate pattern corresponding to a random number code according to an embodiment of this application;

FIG. 6 is a schematic diagram of a second target pattern according to an embodiment of this application;

FIG. 7 is a schematic diagram showing a process of acquiring a reference code according to an embodiment of this application;

FIG. 8 is a schematic diagram of an intermediate pattern corresponding to a first candidate code according to an embodiment of this application;

FIG. 9 is a schematic diagram of a first candidate pattern according to an embodiment of this application;

FIG. 10 is a schematic diagram of an intermediate pattern corresponding to a reference code according to an embodiment of this application;

FIG. 11 is a schematic diagram of a second candidate pattern according to an embodiment of this application;

FIG. 12 is a schematic diagram of a first-level pattern according to an embodiment of this application;

FIG. 13 is a schematic diagram of a beacon according to an embodiment of this application;

DETAILED DESCRIPTION

To make the objectives, technical solutions and advantages of this application clearer, implementations of this application are further described in detail with reference to the drawings.

Before introducing a beacon and a beacon generation method provided by embodiments of this application, the application scenario of the embodiments of this application is first briefly introduced. Along with constant development of the unmanned aerial vehicle technology, the application fields of unmanned aerial vehicles are increasingly wide. Accurate landing of the unmanned aerial vehicles is a crucial link in unmanned aerial vehicle delivery. To make the unmanned aerial vehicle accurately and safely land at a preset position, a beacon is placed at the preset position and consists of a first-level pattern and second-level patterns (at least one second-level pattern is nested in one first-level pattern). A flight altitude of the unmanned aerial vehicle indicated by the first-level pattern is larger than a flight altitude of the unmanned aerial vehicle indicated by the second-level patterns. After detecting and recognizing the beacon, the unmanned aerial vehicle in the air may land at the preset position by adjusting a descent speed and a descent direction based on a recognized beacon. However, the beacon patterns are likely to be stained due to long-term exposure, and the beacon patterns may be inaccurately recognized or cannot be recognized due to external environments such as shadows generated by surrounding objects shielding sunlight, which causes difficulty in accurate landing of the unmanned aerial vehicle. Further, the difference in area of the first-level pattern and the second-level patterns is also a challenging aspect in design, and improper processing/design of the area of the first-level pattern and the second-level patterns is likely to cause the problem of inaccurate landing regardless of a large difference or a small difference. To solve at least some of the above issues, the beacon generation method is provided by embodiments of this application to generate a high-reliability beacon for guiding the unmanned aerial vehicle to accurately land.

Figure 1:
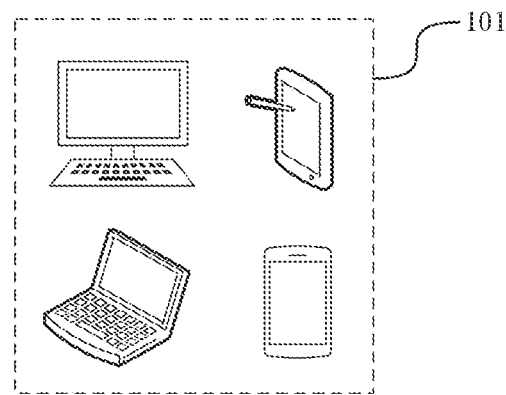
FIG. 1 is a schematic diagram showing an implementation environment of a beacon generation method according to an embodiment of this application.

FIG. 1 is a schematic diagram showing an implementation environment of a beacon generation method according to an embodiment of this application. As shown in FIG. 1, the implementation environment includes: a computer device 101.

The computer device 101 may be an electronic device, or a server, which is not limited by this embodiment of this application. The computer device 101 is configured to execute the beacon generation method provided by this embodiment of this application.

When the computer device 101 is the electronic device, the electronic device may be at least one of a smart phone, a game console, a desk computer, a tablet, an ebook reader, a moving picture experts group audio layer III (MP3) player, a moving picture experts group audio layer IV (MP4) player and a laptop.

When the computer device 101 is the server, the server may be one server or a server cluster composed of a plurality of servers, or any one of a cloud computing platform and a virtualization center, which is not limited by this embodiment of this application. The server may be in communication connection with the electronic device through a wired network or a wireless network. The server may have functions of data processing, data storage and data receiving and transmitting. Of course, the server may also have other functions, which is not limited by this embodiment of this application.

Figure 2:
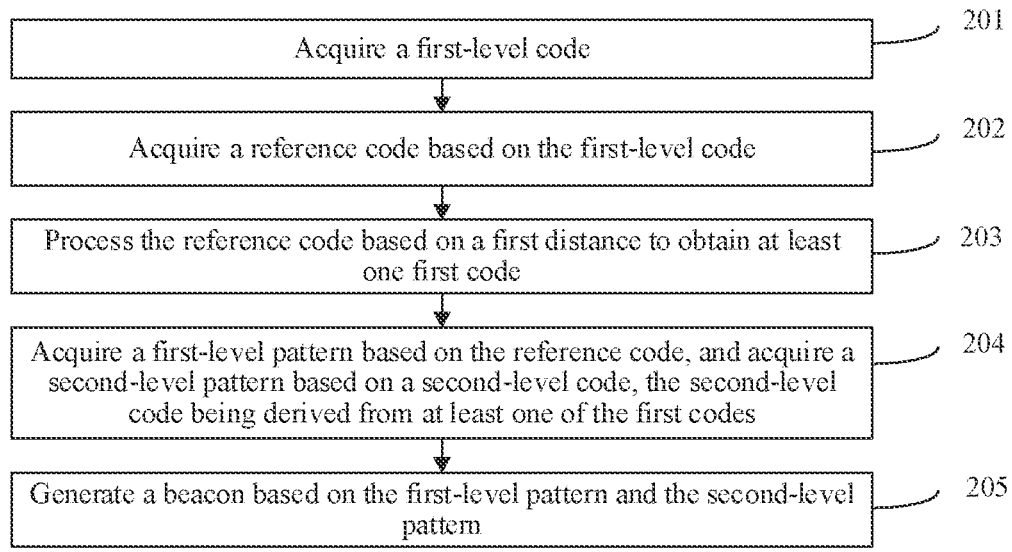
FIG. 2 is a flowchart of a beacon generation method according to an embodiment of this application.

Based on the above implementation environment, this embodiment of this application provides the beacon generation method. Taking a flowchart of a beacon generation method according to an embodiment of this application in FIG. 2 as an example, the method may be executed by the computer device 101 in FIG. 1. As shown in FIG. 2, the method includes following steps:

Step 201: A first-level code is acquired.

In some implementations, the process of acquiring the first-level code is as follows: a random number code is acquired, and processed based on a second distance to obtain at least one second code, and the first-level code is determined in the random number code and the at least one second code. The at least one second code and the random number code are consistent in number of digits, and a distance between any two of the at least one second code and the random number code is not less than the second distance.

The random number code includes a first digit and a second digit, and may be determined by a user, or automatically generated by the computer device based on a random number generator, which is not limited by this embodiment of this application. The first digit and the second digit may be any two different digits, which is not limited by this embodiment of this application. For example, the first digit is 0, and the second digit is 1. The second distance is set by the user, or adjusted according to the application scenario, and the second distance is any distance greater than zero and less than the number of digits of the random number code, and this embodiment of this application does not limit the second distance. The number of digits of the random number code is not less than 4. For example, the number of digits of the random number code is 16, and the second distance is 5.

In some implementations, the random number code is 16 digits long, and the random number code is 1010010100000011.

In some implementations, a distance between the second code and the random number code may be the Hamming distance, or other distances, which is not limited by this embodiment of this application. This embodiment of this application illustrates the distance by the Hamming distance. The Hamming distance is used in data transmission error control coding, and is a concept used for representing the number of different corresponding bits between two codes identical in length. The Hamming distance determining process is as follows: xor (exclusive or) operation is performed on the two codes, the number of digit 1 in a result is counted, and the number of is in the result is the Hamming distance between the two codes.

In some implementations, the random number code is processed based on the second distance. The process of obtaining the at least one second code includes following step 2011 to step 2014.

Step 2011: A first target code is acquired based on the random number code and is consistent to the random number code in number of digits, and a distance between the first target code and the random number code is not less than the second distance.

In some implementations, after the random number code is acquired, digits included in the random number code are modified to obtain the first target code, the first target code is consistent to the random number code in number of digits, and the distance between the first target code and the random number code is not less than the second distance.

In some implementations, the second distance is 5, the random number code is 1010010100000011, and the random number code is processed to obtain the first target code 1010110101101111. The first target code is consistent to the random number code in number of digits, and the distance between the first target code and the random number code is 5.

Step 2012: At least one second target code is acquired based on the first target code, and the second target code is consistent to the first target code in number of digits.

In some implementations, the process of acquiring at least one second target code based on the first target code is as follows: an intermediate pattern corresponding to the first target code is generated. First rotation transformation is performed on the intermediate pattern corresponding to the first target code to obtain at least one first target pattern. A code respectively corresponding to each of the at least one first target pattern is acquired. The code respectively corresponding to each of the at least one first target pattern serves as a second target code. A first rotation transformation angle includes at least one of 90 degrees, 180 degrees and 270 degrees.

In some implementations, the process of generating an intermediate pattern corresponding to the first target code is as follows: A target pattern is acquired based on the number of digits of the first target code, and is composed of grids, and the number of the grids included in the target pattern is consistent to the number of digits of the first target code. Digits included in the first target code are filled into the target pattern according to a target sequence, such that an intermediate pattern corresponding to the first target code is obtained.

The target sequence may be a sequence from left to right and then from top to bottom, or may be a sequence from top to bottom and then from left to right, or may be other sequences, which is not limited by this embodiment of this application.

Figure 3:
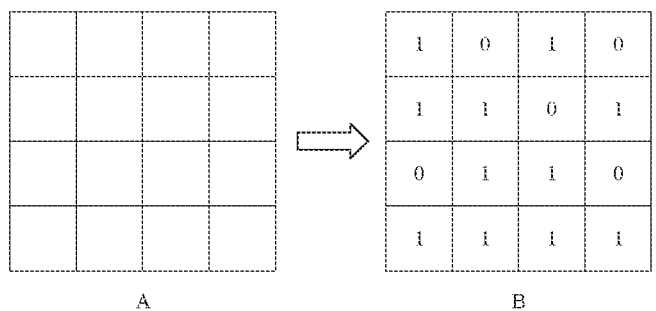
FIG. 3 is a schematic diagram of an intermediate pattern corresponding to a first target code according to an embodiment of this application.

FIG. 3 illustrates a schematic diagram of an intermediate pattern corresponding to a first target code according to an embodiment of this application. A figure A in FIG. 3 is a target pattern, and the target pattern is composed of 16 grids. Digits included in the first target code are filled into the target pattern according to a target sequence (from left to right and then from top to bottom), such that an intermediate pattern corresponding to the first target code is obtained, and a figure B in FIG. 3 is the intermediate pattern corresponding to the first target code.

In some implementations, when the first rotation transformation angle includes any one of 90 degrees, 180 degrees and 270 degrees, first rotation transformation is performed on the intermediate pattern corresponding to the first target code to obtain one first target pattern. When the first rotation transformation angle includes any two of 90 degrees, 180 degrees and 270 degrees, first rotation transformation is performed on the intermediate pattern corresponding to the first target code to obtain two first target patterns. When the first rotation transformation angle includes 90 degrees, 180 degrees and 270 degrees, first rotation transformation is performed on the intermediate pattern corresponding to the first target code to obtain three first target patterns.

Figures 4, 5, 6:
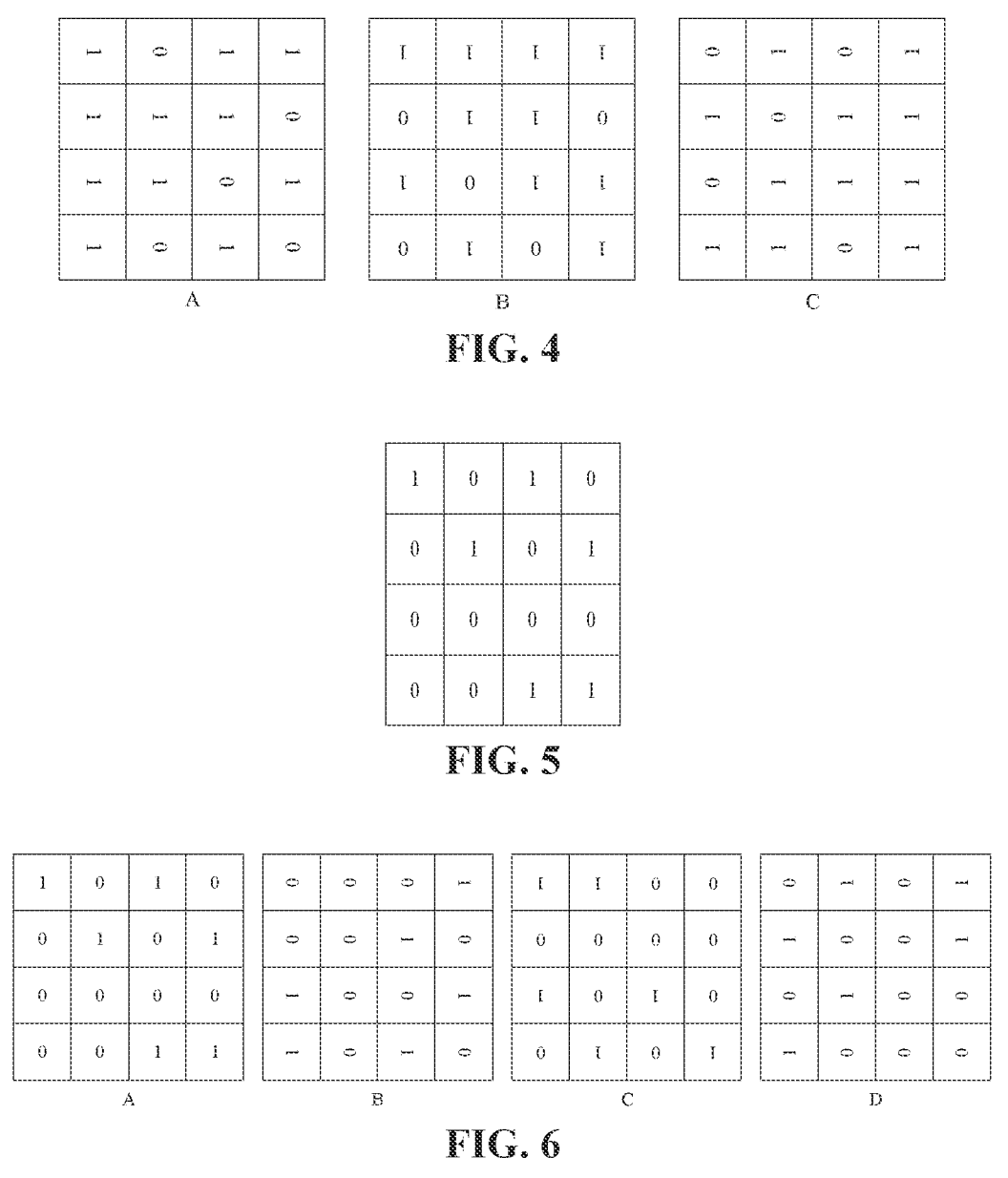

FIG. 4 illustrates a schematic diagram of a first target pattern according to an embodiment of this application. A figure A in FIG. 4 is a first target pattern obtained by rotating an intermediate pattern corresponding to a first target code by 90 degrees. A figure B in FIG. 4 is a first target pattern obtained by rotating the intermediate pattern corresponding to the first target code by 180 degrees. A figure C in FIG. 4 is a first target pattern obtained by rotating the intermediate pattern corresponding to the first target code by 270 degrees.

In some implementations, the process of acquiring a code respectively corresponding to each of the at least one first target pattern is as follows: digits included in each first target pattern are extracted according to a target sequence, and a code corresponding to each first target pattern is obtained. In some implementations, the target sequence is a sequence from left to right and then from top to bottom, digits in the first target pattern are extracted according to the sequence, and a code corresponding to the first target pattern is obtained.

A code corresponding to the first target pattern obtained by rotating the intermediate pattern corresponding to the first target code by 90 degrees is 1011111011011010. A code corresponding to the first target pattern obtained by rotating the intermediate pattern corresponding to the first target code by 180 degrees is 1111011010110101. A code corresponding to the first target pattern obtained by rotating the intermediate pattern corresponding to the first target code by 270 degrees is 0101101101111101.

After the code corresponding to each first target pattern is acquired, the code corresponding to each first target pattern is determined as a second target code, that is, the second target codes are: 1011111011011010, 1111011010110101, and 0101101101111101.

Step 2013: In response to the distance between the at least one second target code and the first target code being not less than the second distance, at least one third target code is acquired based on the random number code.

In some implementations, after the second target codes are acquired, the distance between each second target code and the first target code is determined.

In some implementations, when the distance is the Hamming distance, the process of determining the distance between each second target code and the first target code is as follows: xor operation is performed on the first target code and the second target code, the number of 1s in a result is counted, and the number of 1s in the result is determined as the Hamming distance between the first target code and the second target code.

In order to make the process of determining the distance between the first target code and the second target code clearer, taking the first target code being 1010110101101111 and the second target code being 1011111011011010 as an example, the distance between the first target code and the second target code is determined through following Table 1.

TABLE 1

| First target code | 1 | 0 | 1 | 0 | 1 | 1 | 0 | 1 | 0 | 1 | 1 | 0 | 1 | 1 | 1 | 1 |
|---|---|---|---|---|---|---|---|---|---|---|---|---|---|---|---|---|
| Second target code | 1 | 0 | 1 | 1 | 1 | 1 | 1 | 0 | 1 | 1 | 0 | 1 | 1 | 0 | 1 | 0 |
| Xor operation result | 0 | 0 | 0 | 1 | 0 | 0 | 1 | 1 | 1 | 0 | 1 | 1 | 0 | 1 | 0 | 1 |
| Hamming distance | | | | | | | | 8 | | | | | | | | |

Based on Table 1, after xor operation is performed on the first target code and the second target code, the number of is in an obtained result is 8, that is, the Hamming distance between the first target code and the second target code is 8.

It needs to be explained that, when there are a plurality of second target codes, the distance between each second target code and the first target code is required to be determined, and the process of determining the distance between each second target code and the first target code is similar to the process of determining the distance between the first target code and the second target code in Table 1, which is not repeated herein.

Because the second target code is a code obtained by performing first rotation transformation on the intermediate pattern corresponding to the first target code, in response to the distance between the first target code and the at least one second target code being not less than the second distance, it is indicated that the first target code has large difference and contrast, and low similarity with itself.

In some implementations, the process of acquiring at least one third target code based on the random number code is as follows: in response to the distance between the at least one second target code and the first target code being not less than the second distance and the first target code being a first target code acquired based on the random number code, at least one third target code is acquired based on the random number code. In response to the distance between the at least one second target code and the first target code being not less than the second distance, and the first target code being not a first target code acquired based on the random number code, at least one third target code is acquired based on the random number code and a target code acquired before the first target code. The third target code is consistent to the random number code in number of digits.

In some implementations, the process of acquiring at least one third target code based on the random number code is similar to the process of acquiring at least one third target code based on the random number code and a target code acquired before the first target code, and this embodiment of this application only illustrates the process of acquiring at least one third target code based on the random number code.

In some implementations, the process of acquiring at least one third target code based on the random number code is as follows: an intermediate pattern corresponding to the random number code is generated. Second rotation transformation is performed on the intermediate pattern corresponding to the random number code to obtain at least one second target pattern. A code respectively corresponding to each of the at least one second target pattern is acquired. The code respectively corresponding to each of the at least one second target pattern serves as a third target code. A second rotation transformation angle includes at least one of 0 degree, 90 degrees, 180 degrees and 270 degrees.

The process of generating an intermediate pattern corresponding to the random number code is consistent to the process of generating an intermediate pattern corresponding to the first target code in step 2012, which is not repeated herein. FIG. 5 illustrates a schematic diagram of an intermediate pattern corresponding to a random number code according to an embodiment of this application.

In some implementations, after an intermediate pattern corresponding to a random number code is generated, second rotation transformation is performed on the intermediate pattern corresponding to the random number code to obtain at least one second target pattern. FIG. 6 illustrates a schematic diagram of a second target pattern according to an embodiment of this application. A figure A in FIG. 6 is a second target pattern obtained by rotating the intermediate pattern corresponding to the random number code by 0 degree, and a figure B in FIG. 6 is a second target pattern obtained by rotating the intermediate pattern corresponding to the random number code by 90 degrees. A figure C in FIG. 6 is a second target pattern obtained by rotating the intermediate pattern corresponding to the random number code by 180 degrees. A figure D in FIG. 6 is a second target pattern obtained by rotating the intermediate pattern corresponding to the random number code by 270 degrees.

In some implementations, the process of acquiring a code respectively corresponding to each of the at least one second target pattern is as follows: digits included in each second target pattern are extracted according to a target sequence, and a code respectively corresponding to each second target pattern is obtained. In some implementations, the target sequence is a sequence from left to right and then from top to bottom, the digits in the second target pattern are extracted according to the target sequence, and a code corresponding to the second target pattern is obtained.

The code corresponding to the second target pattern obtained by rotating the intermediate pattern corresponding to the random number code by 0 degree is consistent to the random number code. A code corresponding to the second target pattern obtained by rotating the intermediate pattern corresponding to the random number code by 90 degrees is 0001001010011010. A code corresponding to the second target pattern obtained by rotating the intermediate pattern corresponding to the random number code by 180 degrees is 1100000010100101. A code corresponding to the second target pattern obtained by rotating the intermediate pattern corresponding to the random number code by 270 degrees is 0101100101001000.

After the code corresponding to each second target pattern is acquired, the code corresponding to each second target pattern is determined as a third target code, that is, the third target codes are: 1010010100000011, 0001001010011010, 1100000010100101, and 0101100101001000 In some implementations, in response to a second target code in at least one second target code spaced from the first target code by a distance less than the second distance, there is no need to perform subsequent steps, and return to step 2011 to re-acquire a first target code based on the random number code.

It needs to be explained that, the number of the third target codes acquired based on the random number code is less than the number of the third target codes acquired based on the random number code and the target code acquired before the first target code.

Step 2014: In response to the distance between the at least one third target code and the first target code being not less than the second distance, the first target code serves as a second code.

In some implementations, the distance between the third target code and the first target code is determined, and the process of determining the distance between the third target code and the first target code is consistent to the process of determining the distance between the second target code and the first target code in step 2013, which is not repeated herein.

In some implementations, because the third target code is the code obtained by performing second rotation transformation on the generated code, and in response to the distance between the first target code and the at least one third target code being not less than the second distance, it is indicated that the first target code and other generated codes are large in difference and contrast, and low in similarity.

In some implementations, in response to a third target code in at least one third target code spaced from the first target code by a distance less than the second distance, return to step 2011 to re-acquire a first target code based on the random number code.

It needs to be explained that, based on the random number code, all codes spaced from the random number code by a distance not less than the second distance are enumerated, and whether all the enumerated codes satisfy requirements or not, namely whether all the enumerated codes can serve as second codes or not is determined according to the processes in step 2011 to step 2014.

In some implementations, when the random number code is 16 digits long, and the second distance is 5, 37 second codes satisfying requirements can be generated based on the random number code, and a distance between the random number code and any two of the 37 second codes is not less than 5.

It needs to be further explained that, the number of the acquired second codes is negatively correlated with the second distance. The larger the second distance is, the fewer the second codes are acquired. The smaller the second distance is, the more the second codes are acquired.

In some implementations, the computer device acquires, based on the random number code, second codes by running a formula (1) and a formula (2) as follows:

$$H(m_1^t, m_1^k) - \tau \geq 0, m_1^k \in A'(m_1^t) \quad (1)$$

$$H(m_1^t, m_1^k) - \tau \geq 0, \ m_1^l \in A(m_1^u) \quad (2).$$

In the formula (1) and the formula (2) as above, $m_1^t$ denotes a first target code, $m_1^k$ denotes a second target code, A' denotes a first rotation transformation, $\tau$ denotes a second distance, and $H(m_1^t, m_1^k)$ denotes a distance between the first target code and the second target code. $m_1^l$ denotes a third target code, A denotes a second rotation transformation, $m_1^u$ denotes the random number code and a target code acquired before the first target code, and $H(m_1^t, m_1^l)$ denotes a distance between the first target code and the third target code.

In some implementations, after a second code is determined, one of the second code and the random number code is randomly determined as a first-level code. Or, the second code and the random number code may also be shown to the user, and the user determines one of the random number code and the second code as the first-level code.

In some implementations, the random number code serves as the first-level code among the random number code and the at least one second code, that is, the first-level code is 1010010100000011.

In step 202, a reference code is acquired based on the first-level code.

In some implementations, after the first-level code is acquired, digit filling processing is performed on the first-level code to obtain the reference code. Because the first-level code includes a first digit and a second digit, and either of the first digit and the second digit is adopted for filling.

In some implementations, the process of processing the first-level code to obtain a reference code is as follows: digits included in the first-level code are filled into the target pattern according to a target sequence, such that a pattern corresponding to the first-level code is obtained. A target number of grids are added to the pattern corresponding to the first-level code to obtain a first pattern. Digits are filled into blank grids of the first pattern to obtain an intermediate pattern corresponding to the reference code. Digits included in the intermediate pattern corresponding to the reference code are extracted according to the target sequence to obtain the reference code. The target number is any positive integer, which is not limited by this embodiment of this application.

Figures 7, 8, 9:
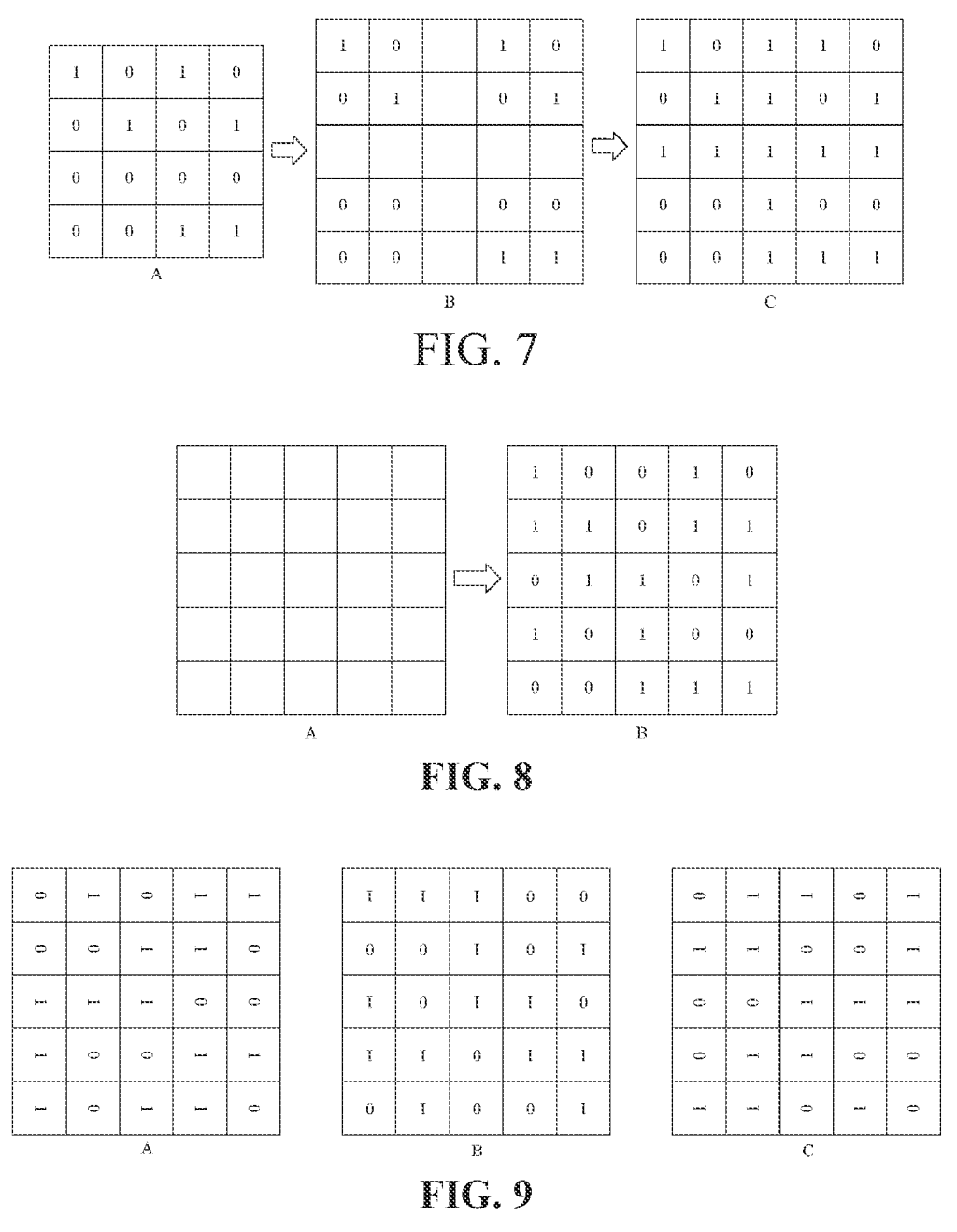

FIG. 7 illustrates a schematic diagram showing a process of acquiring a reference code according to an embodiment of this application. A figure A in FIG. 7 is an intermediate pattern corresponding to a first-level code. A figure B in FIG. 7 is a first pattern. A figure C in FIG. 7 is an intermediate pattern corresponding to the reference code. The digits filled into blank grids in the first pattern in FIG. 7 are 1 (the second digit). On that basis, the obtained reference code is: 1011001101111110010000111. The reference code is 25 digits long, and the number of digits of the reference code is greater than that of the first-level code.

It needs to be explained that, 9 grids are added to the middle of the intermediate pattern corresponding to the first-level code in FIG. 7, and of course, 9 grids may also be added to other positions of the intermediate pattern corresponding to the first-level code, which is not limited by this embodiment of this application.

In step 203, the reference code is processed based on a first distance to obtain at least one first code.

In some implementations, the process of processing the reference code based on a first distance to obtain at least one first code includes following step 2031 to step 2034.

Step 2031: A first candidate code is acquired based on the reference code and is consistent to the reference code in number of digits, and a distance between the first candidate code and the reference code is not less than the first distance.

In some implementations, after the reference code is acquired, digits included in the reference code are modified to obtain the first candidate code, the first candidate code is consistent to the reference code in number of digits, and the distance between the first candidate code and the reference code is not less than the first distance. The distance may be the Hamming distance, or other distances, which is not limited by this embodiment of this application. The first distance is a distance greater than zero and less than the number of digits of the reference code, and the first distance and the second distance may be the same or different, which is not limited by this embodiment of this application.

In some implementations, the first distance is 7. The reference code is 1011001101111110010000111, and is processed to obtain the first candidate code 1001011011011011010000111. The first candidate code is consistent to the reference code in number of digits, and the distance between the first candidate code and the reference code is 7.

Step 2032: At least one second candidate code is acquired based on the first candidate code, and the second candidate code is consistent to the first candidate code in number of digits.

In some implementations, the process of acquiring at least one second candidate code based on the first candidate code is as follows: an intermediate pattern corresponding to the first candidate code is generated. At least one first candidate pattern is obtained by performing first rotation transformation on the intermediate pattern corresponding to the first candidate code. A code respectively corresponding to each of the at least one first candidate pattern is acquired. The code respectively corresponding to each of the at least one first candidate pattern serves as a second candidate code. A first rotation transformation angle includes at least one of 90 degrees, 180 degrees and 270 degrees.

In some implementations, the process of generating an intermediate pattern corresponding to the first candidate code is as follows: a candidate pattern is acquired based on the number of digits of the first candidate code, and is composed of grids, and the number of the grids included in the candidate pattern is consistent to the number of digits of the first candidate code. Digits included in the first candidate code are filled into the candidate pattern according to a target sequence, such that an intermediate pattern corresponding to the first candidate code is obtained.

FIG. 8 illustrates a schematic diagram of an intermediate pattern corresponding to a first candidate code according to an embodiment of this application. A figure A in FIG. 8 is a candidate pattern, and the candidate pattern is composed of 25 grids. Digits included in the first candidate code are filled into the candidate pattern according to a target sequence, such that the intermediate pattern corresponding to the first candidate code is obtained, and a figure B in FIG. 8 is the intermediate pattern corresponding to the first candidate code.

In some implementations, when the first rotation transformation angle includes any one of 90 degrees, 180 degrees and 270 degrees, first rotation transformation is performed on the intermediate pattern corresponding to the first candidate code to obtain one first candidate pattern. When the first rotation transformation angle includes any two of 90 degrees, 180 degrees and 270 degrees, first rotation transformation is performed on the intermediate pattern corresponding to the first candidate code to obtain two first candidate patterns. When the first rotation transformation angle includes 90 degrees, 180 degrees and 270 degrees, first rotation transformation is performed on the intermediate pattern corresponding to the first candidate code to obtain three first candidate patterns.

FIG. 9 illustrates a schematic diagram of a first candidate pattern according to an embodiment of this application. A figure A in FIG. 9 is a first candidate pattern obtained by rotating an intermediate pattern corresponding to a first candidate code by 90 degrees. A figure B in FIG. 9 is a first candidate pattern obtained by rotating the intermediate pattern corresponding to the first candidate code by 180 degrees. A figure C in FIG. 9 is a first candidate pattern obtained by rotating the intermediate pattern corresponding to the first candidate code by 270 degrees.

In some implementations, the process of acquiring a code respectively corresponding to each of the at least one first candidate pattern is as follows: digits included in each first candidate pattern are extracted according to a target sequence, and a code corresponding to each first candidate pattern is obtained.

A code corresponding to the first candidate pattern obtained by rotating the intermediate pattern corresponding to the first candidate code by 90 degrees is 0101100110111001001110110. A code corresponding to the first candidate pattern obtained by rotating the intermediate pattern corresponding to the first candidate code by 180 degrees is 1110000101101101101101001. A code corresponding to the first candidate pattern obtained by rotating the intermediate pattern corresponding to the first candidate code by 270 degrees is 0110111001001110110011010.

After the code corresponding to each first candidate pattern is acquired, the code corresponding to each first candidate pattern is determined as a second candidate code, that is, the second candidate codes are: 0101100110111001001110110, 1110000101101101101101001, and 0110111001001110110011010.

Step 2033: In response to the distance between the at least one second candidate code and the first candidate code being not less than the first distance, at least one third candidate code is acquired based on the reference code and is consistent to the reference code in number of digits.

In some implementations, after the second candidate codes are acquired, the distance between each second candidate code and the first candidate code is determined.

In some implementations, when the distance is the Hamming distance, the process of determining the distance between each second candidate code and the first candidate code is as follows: xor operation is performed on the first candidate code and the second candidate codes, the number of is in a result is counted, and the number of is in the result is determined as the Hamming distance between the first candidate code and the second candidate codes.

In order to make the process of determining the distance between the first candidate code and the second candidate code clearer, taking the first candidate code being 1001011011011011010000111 and the second candidate code being 0101100110111001001110110 as an example, the distance between the first candidate code and the second candidate code is determined through following Table 2.

TABLE 2

| First candidate code | 1 | 0 | 0 | 1 | 0 | 1 | 1 | 0 | 1 | 1 | 0 | 1 | 1 | 0 | 1 | 1 | 0 | 1 | 0 | 0 | 0 | 0 | 1 | 1 | 1 |
|---|---|---|---|---|---|---|---|---|---|---|---|---|---|---|---|---|---|---|---|---|---|---|---|---|---|
| Second candidate code | 0 | 1 | 0 | 1 | 1 | 0 | 0 | 1 | 1 | 0 | 1 | 1 | 1 | 0 | 0 | 1 | 0 | 0 | 1 | 1 | 1 | 0 | 1 | 1 | 0 |

TABLE 2-continued

| Xor operation result | 1 | 1 | 0 | 0 | 1 | 1 | 1 | 1 | 0 | 1 | 1 | 0 | 0 | 0 | 1 | 0 | 0 | 1 | 1 | 1 | 1 | 0 | 0 | 0 | 1 |
|---|---|---|---|---|---|---|---|---|---|---|---|---|---|---|---|---|---|---|---|---|---|---|---|---|---|
| Hamming distance | | | | | | | | | | | | | 14 | | | | | | | | | | | | |

Based on Table 2, after the xor operation is performed on the first candidate code and the second candidate code, the number of is in an obtained result is 14, that is, the Hamming distance between the first candidate code and the second candidate code is 14.

It needs to be explained that, when there are a plurality of second candidate codes, the distance between each second candidate code and the first candidate code is required to be determined, and the process of determining the distance between each second candidate code and the first candidate code is similar to the process of determining the distance between the first candidate code and the second candidate code in Table 2, which is not repeated herein.

Because the second candidate code is a code obtained by performing first rotation transformation on the intermediate pattern corresponding to the first candidate code, in response to the distance between the first candidate code and the at least one second candidate code being not less than the first distance, it is indicated that the first candidate code has large difference and contrast, and low similarity with itself.

In some implementations, the process of acquiring at least one third candidate code based on the reference code is as follows: in response to the distance between the at least one second candidate code and the first candidate code being not less than the first distance, and the first candidate code being a first candidate code acquired based on the reference code, at least one third candidate code is acquired based on the reference code. In response to the distance between the at least one second candidate code and the first candidate code being not less than the first distance, and the first candidate code being not a first candidate code acquired based on the reference code, at least one third candidate code is acquired based on the reference code and a candidate code acquired before the first candidate code. The third candidate code is consistent to the reference code in number of digits.

In some implementations, the process of acquiring at least one third candidate code based on the reference code is similar to the process of acquiring at least one third candidate code based on the reference code and a candidate code acquired before the first candidate code, and this embodiment of this application only illustrates the process of acquiring at least one third candidate code based on the reference code.

In some implementations, the process of acquiring at least one third candidate code based on the reference code is as follows: an intermediate pattern corresponding to the reference code is generated. Second rotation transformation is performed on the intermediate pattern corresponding to the reference code to obtain at least one second candidate pattern. A code respectively corresponding to each of the at least one second candidate pattern is acquired. The code respectively corresponding to each of the at least one second candidate pattern serves as a third candidate code. A second rotation transformation angle includes at least one of 90 degrees, 180 degrees and 270 degrees.

The process of generating an intermediate pattern corresponding to the reference code is consistent to the process of generating an intermediate pattern corresponding to the first candidate code in step 2032, which is not repeated herein. FIG. 10 illustrates a schematic diagram of an intermediate pattern corresponding to a reference code according to an embodiment of this application.

In some implementations, after an intermediate pattern corresponding to a reference code is generated, second rotation transformation is performed on the intermediate pattern corresponding to the reference code to obtain at least one second candidate pattern. FIG. 11 illustrates a schematic diagram of a second candidate pattern according to an embodiment of this application. A figure A in FIG. 11 is a second candidate pattern obtained by rotating an intermediate pattern corresponding to a reference code by 0 degree. A figure B in FIG. 11 is a second candidate pattern obtained by rotating the intermediate pattern corresponding to the reference code by 90 degrees. A figure C in FIG. 11 is a second candidate pattern obtained by rotating the intermediate pattern corresponding to the reference code by 180 degrees. A figure D in FIG. 11 is a second candidate pattern obtained by rotating the intermediate pattern corresponding to the reference code by 270 degrees.

In some implementations, the process of acquiring a code respectively corresponding to each of the at least one second candidate pattern is as follows: digit included in each second candidate pattern are extracted according to a target sequence, and a code corresponding to each second candidate pattern is obtained.

The code corresponding to the second candidate pattern obtained by rotating the intermediate pattern corresponding to the reference code by 0 degree is consistent to the reference code. A code corresponding to the second candidate pattern obtained by rotating the intermediate pattern corresponding to the reference code by 90 degrees is 0010100110111111010110110. A code corresponding to the second candidate pattern obtained by rotating the intermediate pattern corresponding to the reference code by 180 degrees is 1110000100111111011001101. A code corresponding to the second candidate pattern obtained by rotating the intermediate pattern corresponding to the reference code by 270 degrees is 0110110101111110110010100.

After the code corresponding to each second candidate pattern is acquired, the code corresponding to each second candidate pattern is determined as a third candidate code, that is, the third candidate codes are: 0010100110111111010110110, 1110000100111111011001101, and 0110110101111110110010100.

In some implementations, in response to a second candidate code in at least one second candidate code spaced from the first candidate code by a distance less than the first distance, there is no need to perform subsequent steps, and return to step 2031 to re-acquire a first candidate code based on the reference code.

It needs to be explained that, the number of the third candidate codes acquired based on the reference code is less than the number of the third candidate codes acquired based on the reference code and the candidate code acquired before the first candidate code.

Step 2034: In response to the distance between the at least one third candidate code and the first candidate code being not less than the first distance, the first candidate code serves as a first code.

In some implementations, the distance between the third candidate code and the first candidate code is determined, and the process of determining the distance between the third candidate code and the first candidate code is consistent to the process of determining the distance between the second candidate code and the first candidate code in step 2033, which is not repeated herein.

Because the third candidate code is the code obtained by performing second rotation transformation on the generated code, and in response to the distance between the first candidate code and the at least one third candidate code being not less than the first distance, it is indicated that the first candidate code and other generated codes are large in difference and contrast, and low in similarity.

In some implementations, in response to a third candidate code in at least one third candidate code spaced from the first candidate code by a distance less than the first distance, return to step 2031 to re-acquire a first candidate code based on the reference code.

It needs to be explained that, based on the reference code, all codes spaced from the reference code by a distance not less than the first distance are enumerated, and whether all the enumerated codes satisfy requirements or not, namely whether all the enumerated codes can serve as first codes or not is determined according to the processes in step 2031 to step 2034.

In some implementations, when the reference code is 25 digits long, the number of the reference codes is 38, and the first distance is 7, 232 first codes satisfying requirements can be generated according to the above manner, and the distance between any two of the 232 first codes is not less than 7.

It needs to be further explained that, the number of the acquired first codes is negatively correlated with the first distance. The larger the first distance is, the fewer the first codes are acquired. The smaller the first distance is, the more the first codes are acquired.

In some implementations, the computer device acquires, based on the reference code, first codes by running a formula (3) and a formula (4) as follows:

$$H(m_2^t, m_2^k) - \tau^* \geq 0, m_2^k \in A'(m_2^t) \quad (3)$$

$$H(m_2^t, m_2^l) - \tau^* \geq 0, m_2^l \in A(m_2^i) \quad (4).$$

In the formula (3) and the formula (4) as above, $m_2^t$ denotes a first candidate code, $m_2^k$ denotes a second candidate code, A' denotes a first rotation transformation, $\tau^*$ denotes a first distance, and $H(m_2^t, m_2^k)$ denotes a distance between the first candidate code and the second candidate code. $m_2^l$ denotes a third candidate code, A denotes a second rotation transformation, $m_2^i$ denotes a reference code and a candidate code acquired before the first candidate code, and $H(m_2^t, m_2^l)$ denotes a distance between the first candidate code and the third candidate code.

In step 204, a first-level pattern is acquired based on the reference code, a second-level pattern is acquired based on a second-level code, and the second-level code is derived from at least one of the first codes.

In some implementations, after at least one first code is determined, at least one of the first codes is randomly selected, the selected first code serves as the second-level code, that is, the second-level code is derived from at least one of the first codes. In some implementations, four of the first codes are selected as the second-level codes.

It needs to be explained that, there may be more or fewer second-level codes, which is not limited by this embodiment of this application. The number of the second-level codes is required to be less than the total number of the first codes.

In some implementations, the reference code is consistent to the second-level code in number of digits, and both include a first digit and a second digit.

In some implementations, before the first-level pattern and the second-level pattern are acquired, a candidate pattern is required to be acquired based on the number of digits of the reference code, and is composed of grids, and the number of the grids included in the candidate pattern is consistent to the number of digits of the reference code. Because the reference code is consistent to the first candidate code in number of digits, the candidate pattern acquired herein and the candidate pattern acquired based on the number of digits of the first candidate code in step 2032 are the same, the candidate pattern is shown in the figure A in FIG. 8, and the process of acquiring the candidate pattern is not repeated herein.

In some implementations, the process of acquiring a first-level pattern based on the reference code is as follows: digits included in the reference code are filled into the grids included in the candidate pattern according to a target sequence, such that an intermediate pattern corresponding to the reference code is obtained. The intermediate pattern corresponding to the reference code is subject to color rendering based on a first color and a second color to obtain the first-level pattern. The intermediate pattern corresponding to the reference code is shown in the figure C in FIG. 7.

The process of performing, based on a first color and a second color, color rendering on the intermediate pattern corresponding to the reference code to obtain the first-level pattern is as follows: the grids, with the first digit, in the intermediate pattern corresponding to the reference code are rendered into first color, and the grids, with the second digit, in the intermediate pattern corresponding to the reference code are rendered into second color, thereby obtaining the first-level pattern. FIG. 12 illustrates a schematic diagram of a first-level pattern according to an embodiment of this application. In FIG. 12, the first color is black, and the second color is white.

Of course, the first color and the second color may also be other colors, and as long as it is guaranteed that the first color and the second color are different, which is not limited by this application.

In some implementations, the process of acquiring a second-level pattern based on a second-level code is as follows: digits included in the second-level code are filled into grids included in a candidate pattern according to a target sequence, such that an intermediate pattern corresponding to the second-level code is obtained. The intermediate pattern corresponding to the second-level code is subject to color rendering based on the first color and the second color, and thus a first pattern is obtained. An area of the first pattern is adjusted to obtain the second-level pattern, and an area of the second-level pattern is less than that of the first-level pattern.

Because the second-level pattern is required to be superposed above the first-level pattern, when the second-level pattern is consistent to the first-level pattern in area, the first-level pattern will be covered by the second-level pattern, making the first-level pattern unable to be seen. In order to avoid this situation, the area of the first pattern is required to be adjusted to obtain the second-level pattern. In some implementations, the area of the first pattern is reduced to be $\frac{1}{16}$ of the area of the first-level pattern, and then the second-level pattern is obtained.

In step 205, a beacon is generated based on the first-level pattern and the second-level pattern.

In some implementations, the beacon includes one first-level pattern and at least one second-level pattern, wherein the at least one second-level pattern is superposed above the first-level pattern, and an area of the second-level pattern is less than that of the first-level pattern. When there is one second-level pattern, the second-level pattern is directly superposed above the first-level pattern, and as a result, the beacon is obtained. When there are a plurality of second-level patterns, each second-level pattern is superposed above the first-level pattern, and as a result, the beacon is obtained. It needs to be explained that, the second-level patterns are not overlapped.

FIG. 13 illustrates a schematic diagram of a beacon according to an embodiment of this application. In a figure A in FIG. 13, one second-level pattern is superposed above the first-level pattern. In a figure B in FIG. 13, four second-level patterns are superposed above the first-level pattern.

The beacon in FIG. 13 is a two-level beacon, that is, the first-level pattern is a first level, and the second-level pattern is a second level. In order to make the beacon have more levels and more complex, a third-level pattern may be acquired based on a third-level code, the third-level code is derived from a first code, different from the second-level code, in at least one first code, and an area of the third-level pattern is less than that of the second-level pattern. In some implementations, the area of the third-level pattern is ¼ of the area of the second-level pattern. The process of acquiring the third-level pattern is consistent to the process of acquiring the second-level pattern, which is not repeated herein.

Then, the second-level pattern and the third-level pattern are superposed above the first-level pattern to obtain the beacon, and the second-level pattern and the third-level pattern are not overlapped.

In some implementations, four of the first codes are selected as the second-level codes, and five of the first codes except the second-level codes are selected as the third-level codes, that is, there are totally four second-level codes and five third-level codes. The first-level pattern is acquired based on the reference code, four second-level patterns are acquired based on the four second-level codes, and five third-level patterns are acquired based on the five third-level codes. The four second-level patterns and the five third-level patterns are superposed above the first-level pattern to obtain the beacon.

Figure 14:
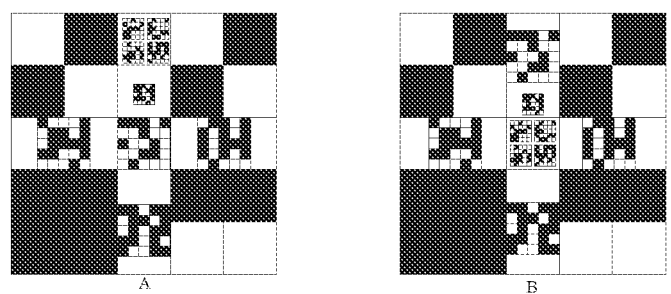
FIG. 14 is a schematic diagram of a beacon according to an embodiment of this application.

FIG. 14 illustrates a schematic diagram of a beacon according to an embodiment of this application. The beacon shown in FIG. 14 is a three-level beacon. In a figure A in FIG. 14, a layout form of the beacon is as follows: one second-level pattern is respectively superposed above a left, right, bottom and middle of the first-level pattern, and five third-level patterns are superposed above a top of the first-level pattern in a layout where four third-level patterns are arranged in a grid of columns and rows, and one third-level pattern is arranged below the grid, thereby obtaining the beacon.

In a figure B in FIG. 14, a layout form of the beacon is as follows: one second-level pattern is respectively superposed above a left, right, bottom and top of the first-level pattern, and five third-level patterns are superposed above a middle of the first-level pattern in a layout where four third-level patterns are arranged in a grid of columns and rows and one third-level pattern is arranged above the grid, thereby obtaining the beacon.

In some implementations, when a downward facing camera of an unmanned aerial vehicle is located at a front portion or a middle rear portion of the unmanned aerial vehicle, the beacon generated according to the layout form in the figure A in FIG. 14 is adopted to assist the unmanned aerial vehicle to land. When the downward facing camera of the unmanned aerial vehicle is located at a middle portion of the unmanned aerial vehicle, the beacon generated according to the layout form in the figure B in FIG. 14 is adopted to assist the unmanned aerial vehicle to land. The first-level pattern in FIG. 14 (i.e., a pattern with a largest area in FIG. 14) is used for performing visual positioning when the unmanned aerial vehicle is at a high altitude. The second-level pattern in FIG. 14 (i.e., a pattern with a moderate area in FIG. 14) is used for performing visual positioning when the unmanned aerial vehicle is at a medium-low altitude. The third-level pattern in FIG. 14 (i.e., a pattern with a smallest area in FIG. 14) is used for performing visual positioning when the unmanned aerial vehicle is at a low altitude. A height corresponding to the high altitude is 15 m or above, a height corresponding to the medium-low altitude is 3 m to 15 m, and a height corresponding to the low altitude is 0 m to 3 m.

Because the different levels of patterns and easy recognizable patterns in different levels in the beacon, the beacon generated according to the layout form shown in FIG. 14 can not only eliminate errors of visual positioning, but also reduce the probability of misrecognition of the unmanned aerial vehicle, and the unmanned aerial vehicle can see the patterns in the beacon from any angle at which the unmanned aerial vehicle flies to the beacon.

It needs to be explained that, the beacon may have more levels, and this application only illustrates the beacon with the two levels and the three levels. FIG. 14 is only an example of a type of the beacon according to this embodiment of this application and is not intended to limit the type of the beacon, and the beacon may also be in other type.

According to the above method, the reference code is processed to obtain the first code, and the distance between the obtained first code and the reference code is not less than the first distance, such that the first code and the reference code are large in difference and contrast. Then, the second-level code is acquired from the first code, the first-level pattern is acquired based on the reference code, and the second-level pattern is acquired based on the second-level code, such that the first-level pattern and the second-level pattern are large in difference and contrast, and low in similarity. The beacon generated based on the first-level pattern and the second-level pattern is beneficial to recognition and positioning of the unmanned aerial vehicle in the air, thereby reducing the probability of misrecognition of the unmanned aerial vehicle, improving recognition accuracy of the unmanned aerial vehicle, then reducing the probability of crash of the unmanned aerial vehicle, and improving a safety coefficient of the unmanned aerial vehicle during landing.

An embodiment of this application further provides a beacon. The beacon is generated according to the embodiment shown in FIG. 2, and includes at least three levels of patterns, including one first-level pattern, at least two different second-level patterns, and at least two different third-level patterns. The at least two different second-level patterns and the at least two different third-level patterns are dispersedly superposed above the first-level pattern. Any two of the at least two different second-level patterns and the at least two different third-level patterns are not overlapped.

An area of the second-level pattern is less than that of the first-level pattern, and an area of the third-level pattern is less than that of the second-level pattern. A diameter of a circumcircle capable of accommodating the at least two second-level patterns is 2-6 times a diameter of a circumcircle capable of accommodating the at least two third-level patterns.

In some implementations, a diameter of a circumcircle capable of accommodating the at least two second-level patterns is 2-5 times a diameter of a circumcircle capable of accommodating the at least two third-level patterns.

In some implementations, the first-level pattern is obtained based on the reference code, the second-level pattern is obtained based on the second-level code, and the third-level pattern is obtained based on the third-level code. The second-level code is derived from at least one first code, at least one first code is obtained based on the reference code, and the third-level code is derived from a first code, different from the second-level code, in the at least one first code. The distance between any two of the at least one first code and the reference code is not less than the first distance, and the first code is consistent to the reference code in number of digits.

In some implementations, the area of the first-level pattern is 9-36 times the area of the second-level pattern, and the area of the second-level pattern is 3-9 times the area of the third-level pattern.

In some implementations, when the first-level pattern and the second-level pattern have small difference in area, the unmanned aerial vehicle is likely to recognize the second-level pattern as the first-level pattern by mistake. Because the flight altitude of the unmanned aerial vehicle indicated by the second-level pattern is lower than the flight altitude of the unmanned aerial vehicle indicated by the first-level pattern, when the unmanned aerial vehicle recognizes the second-level pattern as the first-level pattern by mistake, the unmanned aerial vehicle judges that it is at a considerable altitude from the ground. As a result, the unmanned aerial vehicle will descend at a high speed, causing a high possibility of crash of the unmanned aerial vehicle, and a low safety coefficient of landing of the unmanned aerial vehicle. When the first-level pattern and the second-level pattern have large difference in area, the unmanned aerial vehicle may fail to recognize the second-level code in the landing process, leading to failure in landing of the unmanned aerial vehicle.

In some implementations, the flight altitude of the unmanned aerial vehicle indicated by the first-level pattern is 30 m, the flight altitude of the unmanned aerial vehicle indicated by the second-level pattern is 15 m, and the flight altitude of the unmanned aerial vehicle indicated by the third-level pattern is 3 m. When the unmanned aerial vehicle recognizes the second-level pattern as the first-level pattern by mistake, the unmanned aerial vehicle judges that it is 30 m from the ground (an actual distance from the unmanned aerial vehicle to the ground is 15 m), and starts to descend at a high speed, which may have a high possibility of crash of the unmanned aerial vehicle.

In order to avoid the above situation, in the beacon provided by this embodiment of this application, the area of the first-level pattern is 9-36 times the area of the second-level pattern, and the area of the second-level pattern is 3-9 times the area of the third-level pattern. Preferably, the area of the first-level pattern is 25 times the area of the second-level pattern, and the area of the second-level pattern is 5 times the area of the third-level pattern.

In some implementations, the beacon includes one first-level pattern, four second-level patterns and five third-level patterns. One second-level pattern is respectively superposed above a left, bottom, right and middle of the first-level pattern, and the five third-level patterns are superposed above a top of the first-level pattern in a layout where four third-level patterns are arranged in a grid of columns and rows, and one third-level pattern is arranged below the grid. The figure A in FIG. 14 is the beacon obtained according to the layout manner.

Or, one second-level pattern is respectively superposed above the top, bottom, left and right of the first-level pattern, and the five third-level patterns are superposed above the middle of the first-level pattern in a layout where four third-level patterns are arranged in a grid of columns and rows, and one third-level pattern is arranged above the grid. The figure B in FIG. 14 is the beacon obtained according to the layout manner.

The beacon includes a plurality of second-level patterns and third-level patterns which are all different, such that the beacon can still be recognized even in dirty or shadowy situations. Through the at least three levels of patterns, it is ensured that the unmanned aerial vehicle can recognize the beacon in the process from taking-off to landing, thereby guiding the unmanned aerial vehicle to accurately land more reliably.

It needs to be explained that, information (including but not limited to user device information, user personal information, etc.), data (including but not limited to data for analysis, stored data, displayed data, etc.), and signals involved in this embodiment of this application are all authorized by the user or sufficiently authorized by each party, and related data collection, usage and processing need to comply with relevant laws, regulations, and standards of related countries and regions. For example, the first distance, the second distance, the random number code, etc. involved in this application are all acquired under the situation of sufficient authorization.

Figure 15:
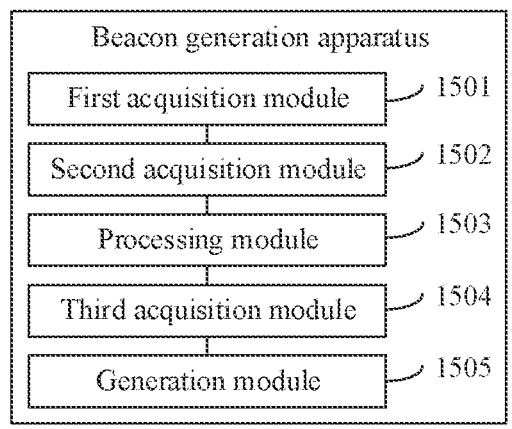
FIG. 15 is a schematic structural diagram of a beacon generation apparatus according to an embodiment of this application.

FIG. 15 illustrates a schematic structural diagram of a beacon generation apparatus according to an embodiment of this application. As shown in FIG. 15, the apparatus includes:

a first acquisition module 1501, configured to acquire a first-level code;

a second acquisition module 1502, configured to acquire a reference code based on the first-level code, the number of digits of the reference code being greater than that of the first-level code;

a processing module 1503, configured to process the reference code based on a first distance to obtain at least one first code, the distance between any two of the at least one first code and the reference code being not less than the first distance, and the first code being consistent to the reference code in number of digits;

a third acquisition module 1504, configured to acquire a first-level pattern based on the reference code, and acquire a second-level pattern based on a second-level code, at least one second-level code being derived from the first code; and a generation module 1505, configured to generate a beacon based on the first-level pattern and the second-level pattern.

In some implementations, the first-level code includes a first digit and a second digit.

The second acquisition module 1502 is configured to fill digits into the first-level code to obtain the reference code, and either of the first digit and the second digit is adopted for filling.

In some implementations, the processing module 1503 is configured to acquire a first candidate code based on the reference code, the first candidate code being consistent to the reference code in number of digits, and the distance between the first candidate code and the reference code being not less than the first distance; acquire, based on the first candidate code, at least one second candidate code, the second candidate code being consistent to the first candidate code in number of digits; acquire, in response to the distance between the at least one second candidate code and the first candidate code being not less than the first distance, at least one third candidate code based on the reference code, the third candidate code being consistent to the reference code in number of digits; and make, in response to the distance between the at least one third candidate code and the first candidate code being not less than the first distance, the first candidate code as a first code.

In some implementations, the processing module 1503 is configured to generate an intermediate pattern corresponding to the first candidate code; perform first rotation transformation on the intermediate pattern corresponding to the first candidate code to obtain at least one first candidate pattern; and acquire a code respectively corresponding to each of the at least one first candidate pattern as a second candidate code.

In some implementations, the processing module 1503 is configured to acquire, in response to the distance between the at least one second candidate code and the first candidate code being not less than the first distance, and the first candidate code being a first candidate code acquired based on the reference code, at least one third candidate code based on the reference code; and acquire, in response to the distance between the at least one second candidate code and the first candidate code being not less than the first distance, and the first candidate code being not a first candidate code acquired based on the reference code, at least one third candidate code based on the reference code and a candidate code acquired before the first candidate code.

In some implementations, the first acquisition module 1501 is configured to acquire a random number code; process the random number code based on a second distance to obtain at least one second code, a distance between any two of the at least one second code and the random number code being not less than the second distance, and the second code being consistent to the random number code in number of digits; and determine a first-level code among the random number code and the at least one second code.

In some implementations, the apparatus further includes:
 a fourth acquisition module, configured to acquire a candidate pattern based on the number of digits of the reference code, the candidate pattern being composed of grids, and the number of grids included in the candidate pattern being consistent to the number of digits of the reference code; and
 the third acquisition module 1504, configured to fill, according to a target sequence, the digits included in the reference code into the grids included in the candidate pattern, such that an intermediate pattern corresponding to the reference code is obtained; and perform, based on a first color and a second color, color rendering on the intermediate pattern corresponding to the reference code to obtain a first-level pattern.

In some implementations, the third acquisition module 1504 is configured to fill, according to a target sequence, digits included in the second-level code into the grids included in the candidate pattern, such that an intermediate pattern corresponding to the second-level code is obtained; perform, based on a first color and a second color, color rendering on the intermediate pattern corresponding to the second-level code to obtain a first pattern; and adjust an area of the first pattern to obtain a second-level pattern, an area of the second-level pattern being less than that of the first-level pattern.

In some implementations, the third acquisition module 1504 is further configured to acquire a third-level pattern based on a third-level code, the third-level code being derived from a first code, different from the second-level code, in at least one first code, and an area of the third-level pattern being less than that of the second-level pattern.

The generation module 1505 is further configured to superpose the second-level pattern and the third-level pattern above the first-level pattern to obtain a beacon, the second-level pattern and the third-level pattern being not overlapped.

According to the above apparatus, the reference code is processed to obtain the first code, and the distance between the obtained first code and the reference code is not less than the first distance, such that the first code and the reference code are large in difference and contrast. Then, the second-level code is acquired from the first code, the first-level pattern is acquired based on the reference code, and the second-level pattern is acquired based on the second-level code, such that the first-level pattern and the second-level pattern are large in difference and contrast, and low in similarity. The beacon generated based on the first-level pattern and the second-level pattern is beneficial to recognition and positioning of the unmanned aerial vehicle in the air, thereby reducing the probability of misrecognition of the unmanned aerial vehicle, improving recognition accuracy of the unmanned aerial vehicle, then reducing the probability of crash of the unmanned aerial vehicle, and improving a safety coefficient of the unmanned aerial vehicle during landing.

It should be understood that, when the apparatus provided in FIG. 15 functions, the division of the foregoing functional modules is merely used as an example for description. In practical application, the foregoing functions may be preset to different functional modules to be completed as required. That is, an internal structure of the device is divided into different functional modules to complete all or some of the functions described above. In addition, the apparatus provided in the foregoing embodiment and the method embodiments belong to the same conception. For a specific implementation process, reference may be made to the method embodiments. Details are not described herein again.

Figure 16:
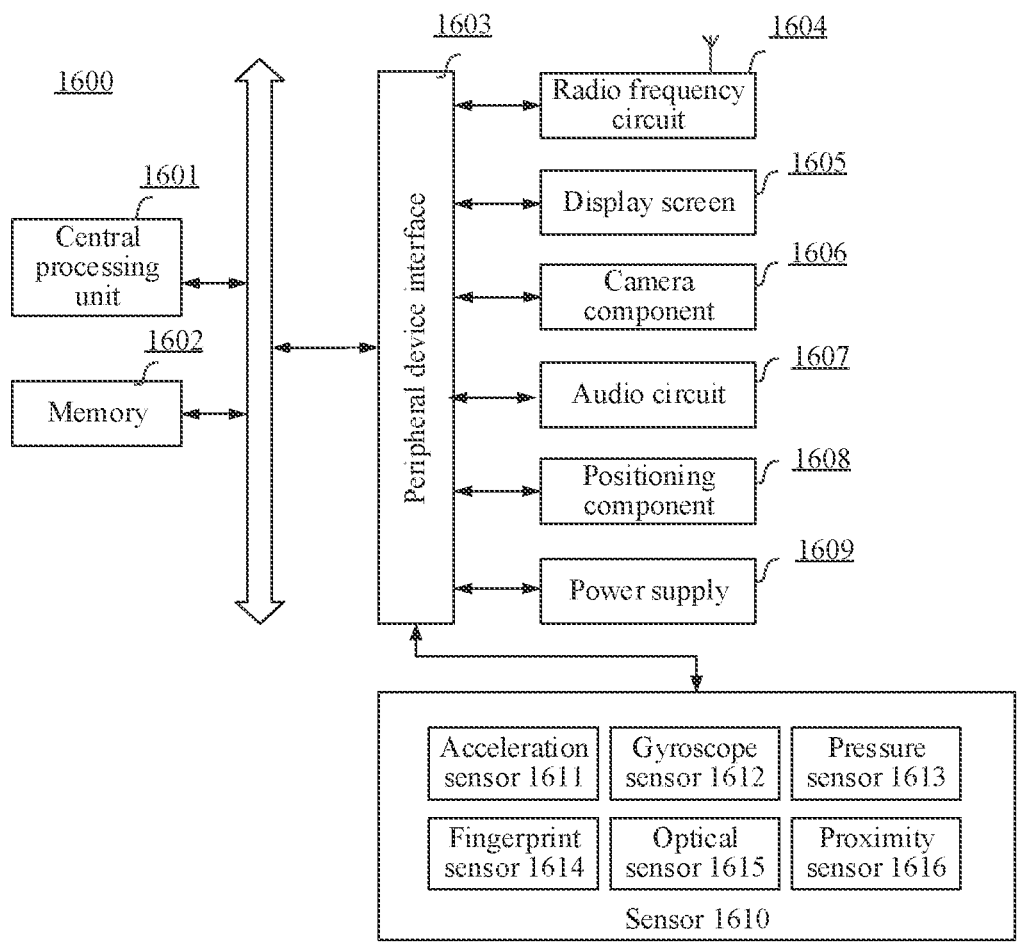
FIG. 16 is a schematic structural diagram of an electronic device according to an embodiment of this application.

FIG. 16 illustrates a block diagram showing a structure of an electronic device 1600 according to an embodiment of this application. The electronic device 1600 may be a portable mobile terminal, such as: a smart phone, a tablet, a moving picture experts group audio layer III (MP3) player, a moving picture experts group audio layer IV (MP4) player, a laptop or a desk computer. The electronic device 1600 may also be called such as user equipment, a portable terminal, a laptop terminal and a desktop terminal.

Generally, the electronic device 1600 includes: a processor 1601 and a memory 1602.

The processor 1601 may include one or more processing cores, such as a 4-core processor or an 8-core processor. The processor 1601 may be implemented in at least one hardware form of digital signal processing (DSP), a field-programmable gate array (FPGA), and a programmable logic array (PLA). The processor 1601 may also include a main processor and a coprocessor. The main processor is a processor configured to process data in an awake state, and is also called a central processing unit (CPU); and the coprocessor is a low-power-consumption processor configured to process data in a standby state. In some embodiments, the processor 1601 may be integrated with a graphics processing unit (GPU). The GPU is configured to render and draw content required to be displayed on a display screen. In some embodiments, the processor 1601 may further include an artificial intelligence (AI) processor. The AI processor is configured to process computing operations related to machine learning.

The memory 1602 may include one or more computer-readable storage media. The computer-readable storage medium may be non-transient. The memory 1602 may further include a high-speed random access memory and a nonvolatile memory, such as one or more disk storage devices or flash storage devices. In some embodiments, the non-transitory computer-readable storage medium in the memory 1602 is configured to store at least one instruction, and the at least one instruction is configured to be executed by the processor 1601 to implement the beacon generation method provided in the method embodiments of this application.

In some embodiments, the electronic device 1600 may optionally include: a peripheral device interface 1603, and at least one peripheral device. The processor 1601, the memory 1602, and the peripheral device interface 1603 may be connected through a bus or a signal cable. Each peripheral device may be connected to the peripheral device interface 1603 through a bus, a signal cable, or a circuit board. In some embodiments, the peripheral device includes: at least one of a radio frequency circuit 1604, a display screen 1605, a camera component 1606, an audio circuit 1607, a positioning component 1608, and a power supply 1609.

In some embodiments, the electronic device 1600 further includes one or more sensors 1160. The one or more sensors 1160 include but not limited to: an acceleration sensor 1611, a gyroscope sensor 1612, a pressure sensor 1613, a fingerprint sensor 1614, an optical sensor 1615, and a proximity sensor 1616.

Those skilled in the art may understand that the structure shown in FIG. 16 constitutes no limitation on the electronic device 1600, and the electronic device may include more or fewer components than those shown in the figure, or some components may be combined, or a different component arrangement may be used.

Figure 17:
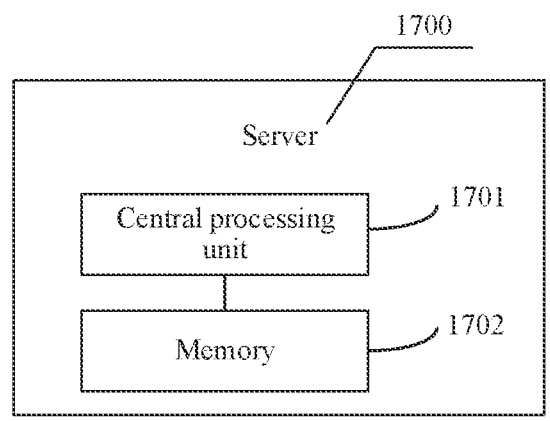
FIG. 17 is a schematic structural diagram of a server according to an embodiment of this application.

FIG. 17 illustrates a schematic structural diagram of a server according to an embodiment of this application. The server 1700 may vary a lot due to different configurations or performance, and may include one or more central processing units (CPUs) 1701 and one or more memories 1702. The one or more memories 1702 store at least one program code, and the at least one program code is loaded and executed by the one or more CPUs 1701 to implement the beacon generation method provided by the foregoing method embodiments. Certainly, the server 1700 may be further provided with components such as a wired or wireless network interface, a keyboard, and an input/output interface, to facilitate input and output. The server 1700 may further include another component configured to implement device functions. Details are not further described herein.

In an embodiment, a computer-readable storage medium is further provided. The storage medium stores at least one program code, and the at least program code is loaded and executed by a central processing unit to implement any above beacon generation method by a computer.

Optionally, the computer-readable storage medium may be a read-only memory (ROM), a random access memory (RAM), a compact disc read-only memory (CD-ROM), a magnetic tape, a floppy disk, an optical data storage device, or the like.

In an embodiment, a computer program or computer program product is further provided. The computer program or computer program product stores at least one computer instruction, and the at least one computer instruction is loaded and executed by a central processing unit to implement any above beacon generation method by a computer.

It should be understood that "plurality of" mentioned in the specification means two or more. "And/or" is only an association relationship for describing associated objects, indicating that three relationships may exist. For example, A and/or B may represent three situations: only A exists, both A and B exist, and only B exists. The character "/" generally indicates an "or" relationship between the associated objects before and after it.

The sequence numbers of the foregoing embodiments of this application are merely for description purpose but do not imply the preference among the embodiments.

The foregoing descriptions are merely exemplary embodiments of this application, and are not intended to limit this application. Any modification, equivalent replacement, improvement and the like made within the spirit and principle of this application shall fall within the scope of protection of this application.

What is claimed is:

1. A beacon for guiding landing of an unmanned aerial vehicle, the beacon comprising:
one first-level pattern and at least one second-level pattern, wherein the at least one second-level pattern is superposed above the first-level pattern, and an area of the second-level pattern is less than that of the first-level pattern;
wherein there are at least two second-level patterns, and the at least one second-level pattern is superposed above the first-level pattern, and wherein the at least two second-level patterns being superposed above the first-level pattern, and any two of the second-level patterns are not overlapped;
wherein the beacon further comprises at least two third-level patterns; and
wherein the at least two second-level patterns and the at least two third-level patterns are dispersedly superposed above the first-level pattern, and any two of the at least two second-level patterns and the at least two third-level patterns are not overlapped, and an area of the third-level pattern is less than that of the second-level pattern.

2. The beacon according to claim 1, wherein the first-level pattern comprises a pattern portion with a first color and a pattern portion with a second color, and the at least one second-level pattern is superposed above the first-level pattern, and wherein the at least one second-level pattern is located on the pattern portion with the first color in the first-level pattern.

3. The beacon according to claim 1, wherein the at least two second-level patterns are different.

4. The beacon according to claim 1, wherein the at least two third-level patterns are different.

5. The beacon according to claim 1, wherein a center position of the first-level pattern is provided with at least one second-level pattern or at least one third-level pattern.

6. The beacon according to claim 1, wherein the area of the first-level pattern is 9-36 times the area of the second-level pattern, and the area of the second-level pattern is 3-9 times the area of the third-level pattern.

7. The beacon according to claim 1, wherein the beacon comprises one first-level pattern, four second-level patterns and five third-level patterns;

one second-level pattern is respectively superposed above a left, bottom, right and middle of the first-level pattern, and the five third-level patterns are superposed above a top of the first-level pattern in a layout where four third-level patterns are arranged in a grid of columns and rows, and one third-level pattern is arranged below the grid;

or, one second-level pattern is respectively superposed above the top, bottom, left and right of the first-level pattern, and the five third-level patterns are superposed above the middle of the first-level pattern in a layout where four third-level patterns are arranged in a grid of columns and rows, and one third-level pattern is arranged above the grid.

8. The beacon according to claim 1, wherein the first-level pattern is obtained based on a reference code, the second-level pattern is obtained based on a second-level code, and the third-level pattern is obtained based on a third-level code, wherein the second-level code is derived from at least one first code, the at least one first code is obtained based on the reference code, and the third-level code is derived from a first code, different from the second-level code, in the at least one first code; and a distance between any two of the at least one first code and the reference code is not less than a first distance, and the first code is consistent to the reference code in number of digits.

9. A landing method for an unmanned aerial vehicle, comprising:

recognizing a beacon, wherein the beacon comprises one first-level pattern and at least one second-level pattern, the at least one second-level pattern is superposed above the first-level pattern, and an area of the second-level pattern is less than that of the first-level pattern; and adjusting a descent speed or descent direction of the unmanned aerial vehicle based on the recognized beacon, such that the unmanned aerial vehicle lands at a preset position;

wherein there are at least two second-level patterns, and the at least one second-level pattern is superposed above the first-level pattern, and wherein the at least two second-level patterns is superposed above the first-level pattern, and any two of the second-level patterns are not overlapped;

wherein the beacon further comprises at least two third-level patterns; and wherein the at least two second-level patterns and the at least two third-level patterns are dispersedly superposed above the first-level pattern, and any two of the at least two second-level patterns and the at least two third-level patterns are not overlapped, and wherein an area of the third-level pattern is less than that of the second-level pattern.

10. The method according to claim 9, wherein the first-level pattern comprises a pattern portion with a first color and a pattern portion with a second color, and the at least one second level pattern is superposed above the first-level pattern, and wherein the at least one second-level pattern is located on the pattern portion with the first color in the first-level pattern.

11. The method according to claim 9, wherein the at least two second-level patterns are different.

12. The method according to claim 9, wherein the at least two third-level patterns are different.

13. The method according to claim 9, wherein a center position of the first-level pattern is provided with at least one second-level pattern or at least one third-level pattern.

14. The method according to claim 9, wherein the area of the first-level pattern is 9-36 times of the area of the second-level pattern, and the area of the second-level pattern is 3-9 times of the area of the third-level pattern.

15. The method according to claim 9, wherein the beacon comprises one first-level pattern, four second-level patterns and five third-level patterns;

one second-level pattern is respectively superposed above a left, bottom, right and middle of the first-level pattern, and the five third-level patterns are superposed above a top of the first-level pattern in a layout where four third-level patterns are arranged in a grid of columns and rows, and one third-level pattern is arranged below the grid;

or, one second-level pattern is respectively superposed above the top, bottom, left and right of the first-level pattern, and the five third-level patterns are superposed above the middle of the first-level pattern in a layout where four third-level patterns are arranged in a grid of columns and rows, and one third-level pattern is arranged above the grid.

16. The method according to claim 9, wherein the first-level pattern is obtained based on a reference code, the second-level pattern is obtained based on a second-level code, and the third-level pattern is obtained based on a third-level code, wherein the second-level code is derived from at least one first code, the at least one first code is obtained based on the reference code, and the third-level code is derived from a first code, different from the second-level code, in the at least one first code; and wherein a distance between any two of the at least one first code and the reference code is not less than a first distance, and the first code is consistent to the reference code in number of digits.

* * * * *